United States Patent [19]

Panik

[11] 4,344,136

[45] Aug. 10, 1982

[54] DEVICE FOR INDICATION OF OPERATIONAL AND COMPUTED VALUES

[75] Inventor: Ferdinand Panik, Fellbach, Fed. Rep. of Germany

[73] Assignee: Daimler-Benz Aktiengesellschaft, Stuttgart, Fed. Rep. of Germany

[21] Appl. No.: 161,321

[22] Filed: Jun. 20, 1980

[30] Foreign Application Priority Data

Jun. 22, 1979 [DE] Fed. Rep. of Germany ....... 2925131

[51] Int. Cl.[3] ........................ G08B 19/00; G06F 15/20

[52] U.S. Cl. .................................. 364/424; 340/52 F; 340/64

[58] Field of Search ............ 364/424; 340/52 R, 52 F, 340/64

[56] References Cited

U.S. PATENT DOCUMENTS

| | | | |
|---|---|---|---|
| 3,866,166 | 2/1975 | Kerscher et al. | 364/424 |
| 3,906,207 | 9/1975 | Rivere et al. | 364/424 |
| 3,964,302 | 6/1976 | Gordon et al. | 340/52 F |
| 4,067,061 | 1/1978 | Juhasz | 364/424 |
| 4,093,939 | 6/1978 | Mitchell | 364/424 |
| 4,150,731 | 4/1979 | Tannenbaum | 340/64 |
| 4,205,376 | 5/1980 | Yoshida | 364/424 |
| 4,209,709 | 6/1980 | Betton | 364/64 |
| 4,222,031 | 9/1980 | Okamoto et al. | 340/52 F |

*Primary Examiner*—Charles E. Atkinson

*Attorney, Agent, or Firm*—Craig and Antonelli

[57] ABSTRACT

An on board vehicular data processing system samples vehicular operating parameters such as fuel level, distance travel, etc. The system calculates values of other parameters such as range and travel time. Under control of the position of the ignition key, which assumes positions representative of modes of operation, OFF, PARK, TRIP, START, the system displays indications of a limited number of sensed and calculated parameters, the particular indications being those which are most useful for the instant mode of operation represented by the position of the ignition key. After a trip, system parameters may be stored for future reference by a predetermined sequencing of the ignition key position. Such storage may be cleared by a second sequencing of the ignition key positions. Parameter reference values may be stored as maximum or minimum and present values for a parameter may be compared with the maximum or minimum and an alarm indication given, acoustical or optical.

22 Claims, 15 Drawing Figures

Figure 1A:
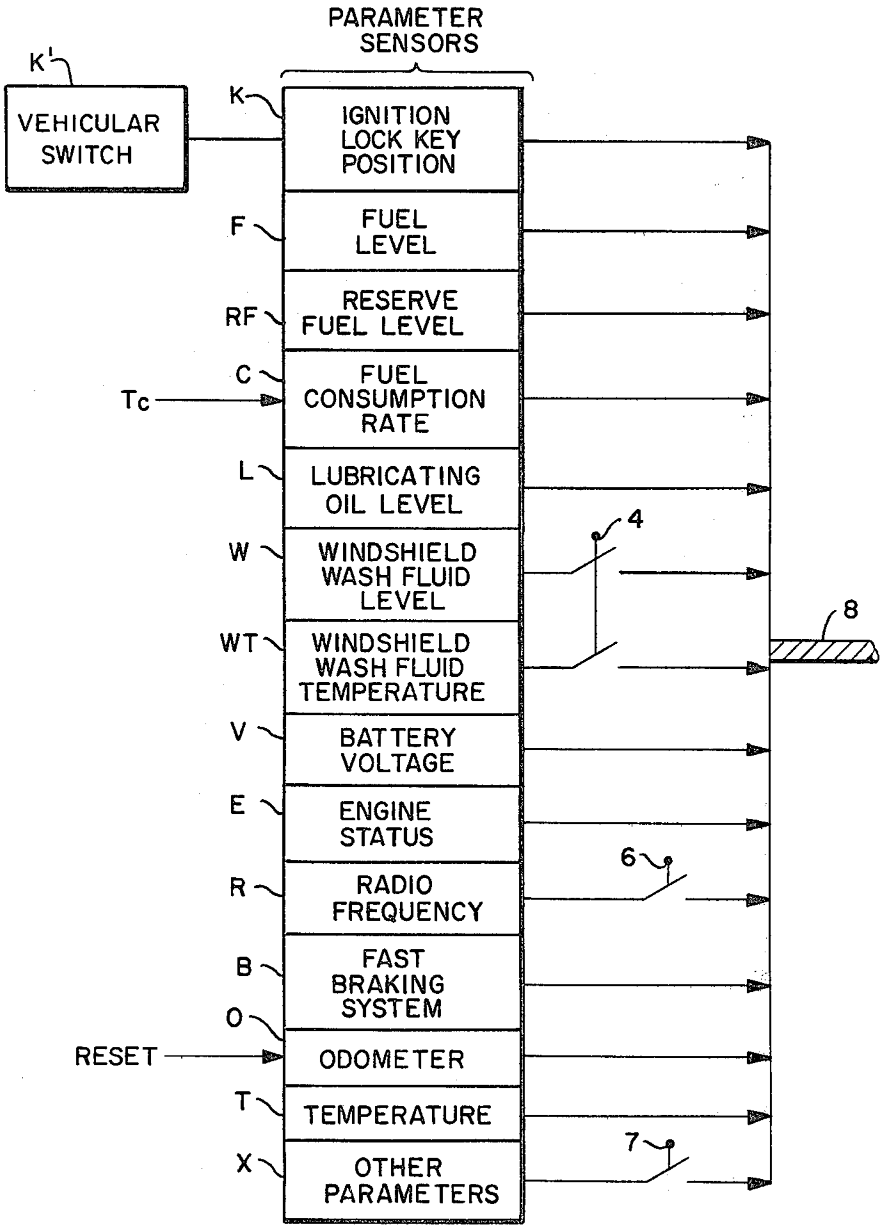

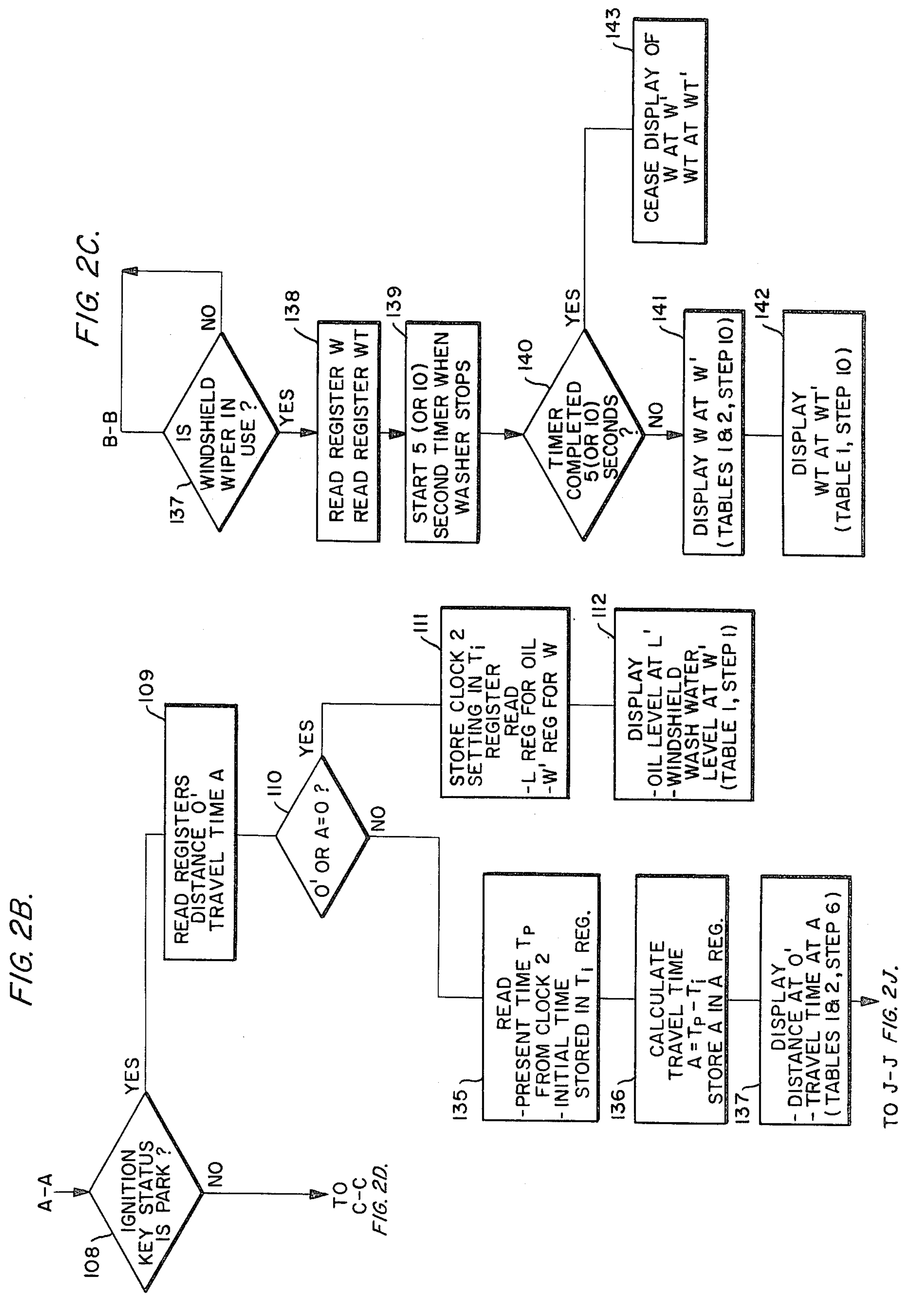
FIG. 2B.
A-A
108
IGNITION KEY STATUS IS PARK ?
NO
TO C-C FIG. 2D.
YES
109
READ REGISTERS DISTANCE O' TRAVEL TIME A
110
O' OR A=0 ?
YES
NO
111
STORE CLOCK 2 SETTING IN Ti REGISTER READ -L REG FOR OIL -W' REG FOR W
112
DISPLAY -OIL LEVEL AT L' -WINDSHIELD WASH WATER LEVEL AT W' (TABLE 1, STEP 1)
135
READ -PRESENT TIME TP FROM CLOCK 2 -INITIAL TIME STORED IN Ti REG.
136
CALCULATE TRAVEL TIME A = TP - Ti STORE A IN A REG.
137
DISPLAY - DISTANCE AT O' - TRAVEL TIME AT A (TABLES 1 & 2, STEP 6)
TO J-J FIG. 2J.
FIG. 2C.
B-B
137
IS WINDSHIELD WIPER IN USE ?
NO
YES
138
READ REGISTER W READ REGISTER WT
139
START 5 (OR 10) SECOND TIMER WHEN WASHER STOPS
140
TIMER COMPLETED 5(OR 10) SECONDS ?
YES
NO
143
CEASE DISPLAY OF W AT W' WT AT WT'
141
DISPLAY W AT W' (TABLES 1 & 2, STEP 10)
142
DISPLAY WT AT WT' (TABLE 1, STEP 10)

DEVICE FOR INDICATION OF OPERATIONAL AND COMPUTED VALUES

The invention relates to a device for monitoring and/or indicating and/or storing operational values and/or computed values by means of switch contacts in vehicles, especially in automobiles, with sensors to pick up the operational data, a computed value for preparation and/or computation and/or storage of the operational and/or computed value and with an indicator unit comprising optical and/or acoustic indicators and with a switching device for the switching on or off of assemblies when threshold values are exceeded or the value falls below the threshold. Such devices are known as "on board computers" or "travel calculators".

In computers offered at the present time, a large number of data are held in readiness that can be called up by the driver by actuation of keys. The information is usually such that it is of no significance for the actual driving operation. In practice the driver, after the initial "play phase" has passed, continuously calls up very little of the offered data because he can master the partly quite complex operation of the device only with constant use of it. After a certain time the instrument on a dashboard is reduced to only one or two kinds of data or it is entirely cut off. Moreover, operation during travel is detrimental to driving safety.

A feature of the present invention resides in the provision in an on-board vehicular computer system on a vehicle having a multi-positioned ignition lock of means for producing signals representing the magnitudes of a first set of parameters related to the operation of the vehicle, a central processing unit for performing calculating, storing, and related operations, means for inputing said signals to said central processing unit, means for storing second signals representing said magnitudes of said parameters in response to receipt of said input signals, means for generating signals representing calculated values of a second set of calculated parameters, means employing different subsets of said second signals for generating signals representing magnitudes of a second set of calculated parameters and means for indicating at least a subset of said sensed parameters and/or a subset of said calculated parameters in response to said multi-position ignition switch in at least one of its positions.

The invention therefore concerns the problem of redesigning such computers so that the driver will receive relevant data for the operational state of the vehicle without excessive attention being required for calling up the data.

This problem is solved according to the invention in that the switch contacts are associated with the ignition lock positions OFF, PARK, TRIP, and START and/or they are automatically switched by the switched-in ignition lock position of the moment and/or the actual operational state, and in that for storing or clearing values, a specific sequence of ignition lock actuation is provided.

If such a computer is not manufactured in series but is built into the vehicle as special equipment, it should not deliver data that are indicated on available instruments. If monitoring functions are disregarded that are relevant for reasons of safety, such a system would look like the system described below with reference to two examples.

The examples are restricted to optical indication. Monitoring of operational data within given threshold values and acoustic alarm when they are exceeded is not indicated. The invention is also not limited to the indicated operational and computed values or sequence of indications.

A first example of an embodiment is discussed below in tabular form with reference to a single line multiple cell indicator unit. Moreover, because this is of great importance, it is specified that normal operational and computed values are to be indicated so long as the associated operational state persists, whereas other values that are associated with hand-actuated assemblies or special circumstances, are indicated instead of the normal values or they are shown supplementarily and/or for a specific time,—e.g. water content of the windshield wiper unit, or tank reserve.

Such an indicator cycle can look therefore as indicated below:

TABLE I

| Ignition lock setting | Operational state | Indicated value | Indication, example |
|---|---|---|---|
| 1. OFF PARK | Engine off | Oil level<br>Wash-water level | OIL 0.8<br>WW 0.2 |
| 2. START | Starting | Battery voltage in idling and under load | BATTERY 11.8–8.3v |
| 3. TRIP | Engine idling | ca. 15s Range | RANGE 235 km |
| 4. | | then average consumption and range | 13.5 liters/100 235 km |
| 5. | Driving operation | Consumption at the moment and range at that rate | 15.5 liters/100 235 km |
| 6. PARK | Engine off after driving | Distance covered and travelling time | 170 km 4:08 hr |

Special conditions can be indicated as follows:

| | |
|---|---|
| 7. Tank reserve before beginning to drive | RESERVE since 18 km |
| in state 4 and 5 according to table 1 indication instead of range | 13.5 liters/100 reserve 18 km |
| 8. Driving with "tempomat" Indication instead of range | 14.5 liters/100 speed 145 |
| 9. Braking with antibloc system | ABS OPERATING |

In operation of the following assemblies there can be an indication up to 5 or 10 s after the end of use:

| | |
|---|---|
| 10. Windshield washing facility Indication of temperature and reserve of water | +12° C. WW 0.2 |
| 11. Switching on of "tempomat" | TEMPOMAT 145 km/hr |
| 12. Tuning of car radio Indication of frequency | FREQUENCY 94.3 MHZ |

With fast braking the starting and final velocity and the duration of braking can be indicated

| | |
|---|---|
| 13. | 157–102 km/hr 4.3S |

TABLE II

| | |
|---|---|
| 1. Ignition lock position OFF or PARK | |
| Oil level | OIL LEVEL 0.8 |
| Windshield washer water | WASH WATER 0.2 |
| 2. Position START | |
| Battery voltage idling | BATTERY MAX 11.8 v |
| Battery voltage load | BATTERY MIN 8.3 v |
| 3. Position TRIP (15 s) | |
| Range | RANGE 235 km |

TABLE II-continued

| | | |
|---|---|---|
| | Temperature | TEMPERATURE +12° C. |
| 4. | Normal operation | |
| | Consumption of the moment, range | 15.5 liters/100 235 km |
| | Temperature | TEMPERATURE +12° C. |
| 5. | Idling (or up to 10 km/hr) | |
| | Average consumption, range | 13.5 liters/100 235 km |
| | Temperature | TEMPERATURE +12 ° C. |
| Position PARK (after travel) | | |
| 6. | Trip balance | |
| | Average consumption, total consumption 13.5 liters/100 23 liters | |
| | Distance, travel time | 170 km 4.08 hr |
| SPECIAL STATES (respectively shown in the 2nd line) | | |
| 7. | Special state Tank reserve | |
| | In (3), (4) and (5) | see above |
| | (Range indication dropped) | RESERVE SINCE 18 km |
| 8. | Special state Tempomat drive | see above |
| | In dropping of the speed by more than 50 km/hour as opposed to tempomat setting in (4) (5) and (7) | TEMPOMAT 145 km/hour |
| 9. | Special state ABS | see above |
| | In response of the ABS during braking in (4) (7) (8) for 5 s | ABS OPERATING |
| OPERATION | | |
| 10. | Operation of the wash facility | see above |
| | In all positions | WASH WATER 0.2 |
| 11. | Operation of the Tempomat | see above |
| | In all positions | TEMPOMAT 145 km/hour |
| 12. | Operation of the radio | see above |
| | In all positions | FREQUENCY 94.3 MHZ |
| ACCIDENT (indicated in both lines) | | |
| 13. | Brake course | |
| | Initial and end velocity | 157 km/hr 102 km/hr |
| | Braking time | BRAKING TIME 4.3 sec |

If after a trip is completed, specific operational or computed values are to be stored (aside from those that are always stored), this can be effected by actuation of the ignition lock in a specific way. Preferably the sequence will be TRIP, PARK, TRIP, PARK, OFF. These values are cleared however if the ignition key is turned from TRIP directly via PARK to OFF.

From the foregoing, it will be appreciated that an object of the invention resides in an improved on board vehicular computing system.

Another object of the invention resides in an on board vehicular computing system which senses a first set of vehicular parameters, stores said parameters and produces indications of one or more subsets thereof during one or more particular time periods of vehicular operation.

Another object of the invention resides in an improved on board vehicular computing system which samples and stores a set of operational parameters of the vehicle, calculates values of a second set of calculated parameters employing various subsets of said first set of sensed parameters to indicate various subsets of said sensed and calculated parameters.

Another object of the invention resides in an on board vehicular computing system which senses a frist set of vehicular parameters, stores said parameters and produces indications of one or more subsets thereof during one or more particular time periods of vehicular operation, wherein one or more of said sensed and/or calculated parameters are compared with a corresponding stored maximum or minimum value to determine whether the maximum or minimum has been reached, and the result is optically or acoustically indicated as an alarm.

Another object of the invention resides in the provision of an improved on board vehicular computing system which displays different subsets of vehicular operational parameters during different vehicular operation periods under control of the position of the vehicle ignition key.

Another object of the invention resides in the provision of an improved on board vehicular computing system which displays different subsets of vehicular operational parameters during different vehicular operation periods under control of the position of the vehicle ignition key wherein, after completion of a trip, a predetermined sequence of ignition key positionings may be used to store values of selected parameters in an area in memory, and by a second predetermined sequence of ignition key positionings such areas in memory may be cleared.

These and other objects, features and advantages of the present invention will become more apparent from the following description when taken in connection with the accompanying drawings, which show, for the purpose of illustration only, one embodiment in accordance with the present invention, and wherein:

FIGS. 1A and B constitute a block diagram of a preferred embodiment of the invention.

FIGS. 2A–M are flow charts explaining the operation of the system of FIG. 1.

It is, of course, axiomatic that if a problem can be defined in some form of notation, answers thereto can be calculated either by use of a dedicated computer, analog or digital, or by means of programming the problem on a general purpose analog or digital computer.

Applicants' system may be implemented by any of these alternatives.

The preferred embodiment shown in FIGS. 1 and 2 is disclosed as a programmable general purpose digital computer with attendant programming therefor.

FIGS. 1A and B disclose a central processing unit 1 capable of conventional four-function arithmetic operations and concatenations thereof. The details of the device are conventional and do not, per se, constitute the invention. Within the block 1, are shown a clock timer 2 and an analog-digital (A–D) converter 3, the specific functions of which will be described later.

FIG. 1A discloses the several sensing elements, which serve to capture parameter data at the respective sources, from which data is transmitted to the central processing unit for subsequent processing.

A sensor such as those shown at K–X, FIG. 1A, may take the form of a device which produces a voltage as a result of the sensing of the parameter. While the magnitude and character of the voltage may take many forms, pulse coding, frequency modulation, and the like, the particular type of sensor shown is contemplated as a device which translates the parameter into a low DC voltage, for example, within the range of the battery voltage of the vehicle.

Sensor K translates the position of the ignition lock key in its several positions of OFF, PARK, START and TRIP into four voltage levels, only one of which exists at the output of K at any one time inasmuch as the ignition key can assume only one position at a time. Exemplary voltages are three, six, nine and twelve volts.

Fuel level sensor F measures the amount of fuel available in the main tank of the vehicle. Such sensors are old in the art and may produce a varying DC voltage at the output of F. Such a varying voltage would represent fuel available, for example, translatable to liters.

Reserve fuel level sensor RF performs the same function with the same kind of varying voltage for a reserved fuel tank. It will be understood that the vehicle operator may manually switch fuel intake to the engine from the main tank to the reserve tank and vice versa.

Fuel consumption rate C may be determined by a sensor which meters the fuel flow between the fuel tank in use and the carburetor. Inasmuch as the parameter sense is one of rate, a starting pulse Tc is transmitted to begin measurement from the clock timer 2. The output of C thus is an ever rising voltage which will be sensed after the very brief interval, before it reaches maximum vehicle battery voltage, a subsequent timing signal Tc being transmitted repetitively from the clock timer 2. Thus, the voltage at the output of C may take the form of an approximate sawtooth wave.

Lubricating oil level sensor L is structurally similar to the level sensors F and RF and produces a DC voltage representative of the amount of lubricating oil available to the engine. This is also translatable into liters, for example, by central processing unit 1.

Similarly, windshield wash fluid level is sensed in sensor W, the sensor measures fluid level and may be structurally similar to sensors F, RF, and L. A DC voltage will be presented at the output representing the amount of fluid available in the storage container for washing the windshield, translatable by the central processing unit 1 into volumetric measure such as liters.

Windshield wash fluid temperature sensor WP measures the temperature, in degrees Celsius or Fahrenheit of the wash fluid in the container in which the level was measured. A DC voltage may be produced at the output of WT.

Actuation of the windshield wash mechanism is controllable from the control panel of the vehicle and does not constitute any part of the instant invention. However, actuation of the sensors may be coordinated therewith so that sensing voltages from W and WT will be presented for sensing only upon actuation of the windshield or such other special timing. This is indicated by the ganged switch 4 in the output of W and WT. Alternatively, such control can be effected by input at the keyboard 5, FIG. 1B.

Battery voltage is measured by sensor V which may be constituted by a DC voltmeter providing an output from sensor V.

Sensor E indicates whether the vehicle engine is in status OFF, IDLE or LOAD. This may be effected by a conventional tachometer which will measure revolutions per unit time to generate a DC voltage at the output of sensor E.

The frequency to which the vehicle radio is tuned is determined by sensor R and may take the form of a potentiometer which measures the position of the frequency tuning mechanism of the radio, producing a DC voltage at the output of sensor R.

Under certain special conditions, the vehicle operator may wish to indicate or not indicate this parameter during any particular vehicle operation and accordingly a switch 6 is provided in the output of sensor R which may be actuated either from the control panel of the vehicle or from the keyboard 5.

Fast braking system sensor B is designed to produce indications of the vehicular speed at two particular points in time, initial braking and end of braking. This may take the form of sensing the vehicle speed indication of the speedometer by means of a DC voltage presented at the output of sensor B.

Sensor O also measures a parameter from the speedometer, namely, the odometer reading. At the start of each trip a reset signal must be introduced as an input to sensor O which may be provided alternatively from a manual control, from the control panel of the vehicle, from keyboard 5, or automatically from the programming of central processing unit 1.

Temperature is measured by sensor T, the latter being constituted by a theromometer which generates a DC voltage as an output. This sensor may be located appropriately for measuring a temperature desired by the vehicle operator.

It will be apparent to those skilled in the art that other parameters may be sensed by appropriate sensors, an example of which would be cruise speed controls and the like. Such parameters are indicated by the sensor X. Inasmuch as such a sensor, depending upon the parameter sensed, may or may not require selective switching, the capability to provide such is indicated by a switch 7 in the output of block X. Such a switch will be actuatable, as desired, from the vehicle control panel, the keyboard 5 or automatically from the programming of central processing unit 1. Cable 8 carries the outputs of sensors K–X to parameter commutator 9 of FIG. 1B. Clock timer 2 generates commutator timing signal $T_1$ which is input to the commutator to sequentially present a single one of the outputs of sensors K–X to A–D converter 3 on line 10. Timing signal $T_2$ is provided by clock timer 2 to synchronize A–D converter 3 to produce on the line 11 a sequential train of signals which represent the magnitudes of the parameters sensed at sensors K–X. Such signals are coded and may properly be, for example, binary coded signals or binary coded decimal signals or the like. These signals are transmitted to memory 12 where they are stored in corresponding registers, one register for each parameter.

It will be noted that the characteristics of the parameters sensed in sensors K–X are disparate in character and consequently may require different treatment numerically. Thus, three distinct voltage readings may be entirely satisfactory for key position K whereas for engine status E or odometer reading O, multidigit numbers may be required in order to achieve a level of accuracy. For such accuracy, the sensors K–X may take on the form of pulse coded sensors wherein the parameter sensed is translated into a multidigit pulse code, binary, binary coded decimal, octal or the like, the sensors being under the control of the central processing unit 1 for synchronization purposes. The outputs appearing in cable 8 may then, under the control of the central processing unit 1 be transmitted directly to the parameter registers of memory 12 without the necessity of parameter commutator 9 or A–D converter 3. In such a configuration, greater complexity is introduced at the sensor location in order to achieve accuracy and some economy in the central processing unit is achieved by the omission of elements 3 and 9. As set forth in Tables I and II, certain of the parameters sensed will, at particular times during the operational stages of the vehicle, be displayed as sensed. Indicators F′, RF′, C′, L′, W′, WT′, V′, R′, O′, T′, X′ of FIG. 1B designate indicators for the parameters having comparable alphabetical designation of the parameter sensors of FIG. 1A and the parameter registers of memory 12. To this end, central processing unit 1, appropriately programmed as to timing, will read the parameter registers for such parameters and transmit to the indicators the data stored in the registers.

The parameter indicators may be structured according to any one of a variety of architectures. An optical indication may be of the single-row multiple-cell letter and numeral type. Acoustic indicators are also contemplated.

Certain of the displays are temporary in character being timed to exist only for a few seconds. Timing pulses $T_3$ and $T_4$ and the like may be provided by clock timer 2 to designate the periods during which such displays will be actuated, as will be described in greater detail.

Central processing unit 1, in addition to transmitting sensed parameter magnitudes to the sensed parameter indicators, also performs mathematical functions to determine a variety of calculated parameters which are also to be indicated. The indicators for these parameters are shown as A, D, G, H, I, J, M, N, P, Q, S, and X″. The manner of calculation will be described in connection with FIG. 2.

In a similar manner to that described in connection with the sensed parameter indicators, certain of the calculated parameter indicators also display outputs temporarily. The calculated parameter indicators may be of the same architecture and operated in the same manner as those of the sensed parameter indicators.

Memory unit 12, in addition to the sensed parameter registers previously discussed, includes calculated parameter registers for the comparable parameters A–X″ previously identified. Thus, calculations are performed employing the data from appropriate sensed parameter registers to arrive at values for particular calculated parameters which are, after such calculation, stored in a corresponding calculated parameter register within the group 13.

Memory 12, in addition to the sensed parameter and calculated parameter registers also contains memory 14 for conventional operations of the central processing unit 1, as, for example, storage for the operating system and storage to be used in the attendant data processing and arithmetic operations performed incident to the sensing, conversion, storage and retrieval, and indication of both sensed and calculated parameters.

In determining certain of the calculated parameters, initial values for fuel level sensed at sensor F and fuel consumption rate sensed at sensor C must be stored. These values are stored respectively in calculated parameter registers $F_1$ and $C_1$. Thus, at any point in time after an initial point in time, two values are stored in the sensed parameter registers for fuel level F and fuel consumption rate C, the initial sensed values which are constant throughout a trip stored in $F_1$ and $C_1$ and the most recently sensed values stored in registers F and C, which vary as successive data are received.

Central processing unit 1 also includes a fast brake timer 15. This timer is started when a data element is first inserted in the initial velocity register P as received from fast braking system sensor B. The timer is stopped upon sensing a new data element inserted in end velocity register Q. The time period registered by timer 15 is stored in calculated parameter register S.

In summary, for FIGS. 1A and B, operational parameters are sensed at various points in the vehicle system, the data is transformed into digital numerical code which is stored in sensed parameter registers in memory by way of the central processing unit. Values for calculated parameters are derived from the values for sensed parameters standing in the registers, the calculated values being subsequently stored. Values standing in both the sensed and calculated parameter registers are selectively displayed under the control of the central processing unit 1 in the sensed and calculated parameter indicators. The control of the subset of parameters to be displayed is determined by the status of the ignition lock key position in the respective OFF, PARK, START, and TRIP positions.

Attention is now directed to the flow chart FIG. 2 which discloses the manner in which the system of FIG. 1A and B carries out the system operations.

With the system of FIGS. 1A and B in the "ON" condition, and ignition key inserted in the ignition lock in the OFF position, all registers are initialized, that is, given zero settings, and the setting Ti of the clock 2 at that instant is stored in the Ti sensed parameter register as shown in step 100.

In step 101, the central processing unit (CPU) 1 initiates the sequential sensing of each of the parameters K–X. This is effected by parameter commutator 9 receiving the timing input T1 or, alternatively, as previously indicated, by the reception in the CPU 1 of digital coded data generated in the sensors, per se.

As shown in step 102, data on line 10 is converted to a digitally coded signal. In the alternative mode, this step is performed ab initio in the sensors themselves.

The data so received by the CPU 1 is stored in the corresponding sensed parameter registers K–X. It will be noted that the very first data received from F and C, under the control of CPU 1 will be deposited in registers $F_1$ and $C_1$, these being initial data. Further, the fast braking system data B is in effect deposited in two registers P and Q which make up the B data. Put another way, the B register is composed of two separate registers, P and Q. Manifestly, since the data for fast braking occurs primarily in emergency circumstances, these registers will, for the most part, remain empty.

Following step 103, the computer is caused to identify the completion of the storage cycle in step 104 and in step 105 reinitiates the cycle of sensing parameters. If desired, a time delay may be specifically inserted.

It will be appreciated that as successive cycles of sensing proceed, after the first sensing, data for fuel level F and fuel consumption rate C will be inserted in the respective sensed parameter registers F and C, as distinguished from the initial data which was stored in registers $F_1$ and $C_1$. Thus, as successive sensing cycles proceed, if any of the variables sensed change in magnitude, the values standing in the sensed parameter registers corresponding thereto will change so that the sensed parameter registers constitute a continuing registration of the latest status of the sensed parameters.

At step 106, the memory is read for the radio frequency value from register R and the value is displayed at indicator R′. This corresponds to Tables I and II, step 12. It may be instituted, as previously indicated by the closing of switch 6, FIG. 1A.

At block 107, the status of the ignition key position is read from register K. As previously indicated, it may have one of four values for the respective positions OFF, PARK, START, and TRIP.

At step 108, FIG. 2B, the value is tested to determine whether the status is PARK. If the answer is yes, it is necessary to distinguish from PARK condition before starting a TRIP (Table I, step 1) and PARK after a TRIP (Table I, step 6). Before starting a TRIP, the distance and travel time registers O′ and A will have no data stored, whereas after a TRIP, values for the TRIP distance and travel time will have been recorded.

Decision block 110 sensed the readings or O′ and/or A to determine whether values are equal to zero. If the answer is yes, this represents the initial PARK position of Table I, step 1 and accordingly, functions in block 111 are performed.

The initial time setting from clock timer 2 must be stored in register Ti so that as the prospective TRIP progresses and clock timer 2 advances, the initial setting will be available in order to determine travel time. Additionally, the L register is sensed for the value of oil level and the W′ register is sensed for the windshield wash water level. These values are displayed in indicators L′ and W′ respectively thereby satisfying the indication requirements of Table I, step 1, as shown in block 112.

Returning to decision block 108, if the ignition status is not PARK it is subsequently tested for START in block 113 of FIG. 2D. If the answer is yes, battery voltage is read from register V in block 114 and displayed in indicator V′ in block 115 thereby satisfying the requirement for Table I, step 2. It will be appreciated that as values change, for example during engine idling or under load, the value at V′ will vary.

Returning to block 113, if the ignition key status is not START, then TRIP status is indicated and it is necessary to make a calculation for range G which will be used for display in steps 3 and 4 of Table I. Accordingly, in block 116, values for distance (register O), fuel level F and fuel consumption rate C are read. In block 117 a calculation of range G is made from the product of fuel level F and fuel consumption rate C.

It will be appreciated that, if desired, the value for fuel level employed in the calculation of range G may also include the reserved fuel level RF. In such a case, the formula would be $G=(F+RF)\times C$. The range value is then stored as shown in block 118 in the calculated parameter register G.

In TRIP status, it is necessary to determine whether the engine is idling or in driving operation as indicated in Table I, steps 3, 4 and 5. Decision block 119 makes this determination by reading the engine status register E which, as previously indicated may carry the most recent tachometer reading. Such a reading is compared against a stored value for idling (stored in memory 12), and if it is equal to or less than such a value, the engine is determined as being idling state and it will be necessary to indicate a range reading. As indicated in Table I, step 3, such a reading is a temporary one, for example, 15 seconds. Accordingly, the range value previously calculated is read from register G in block 120 and, under control of CPU 1, a timer is started for the purpose of timing out the desired diaplay period of 15 seconds in block 121.

Figure 2A:
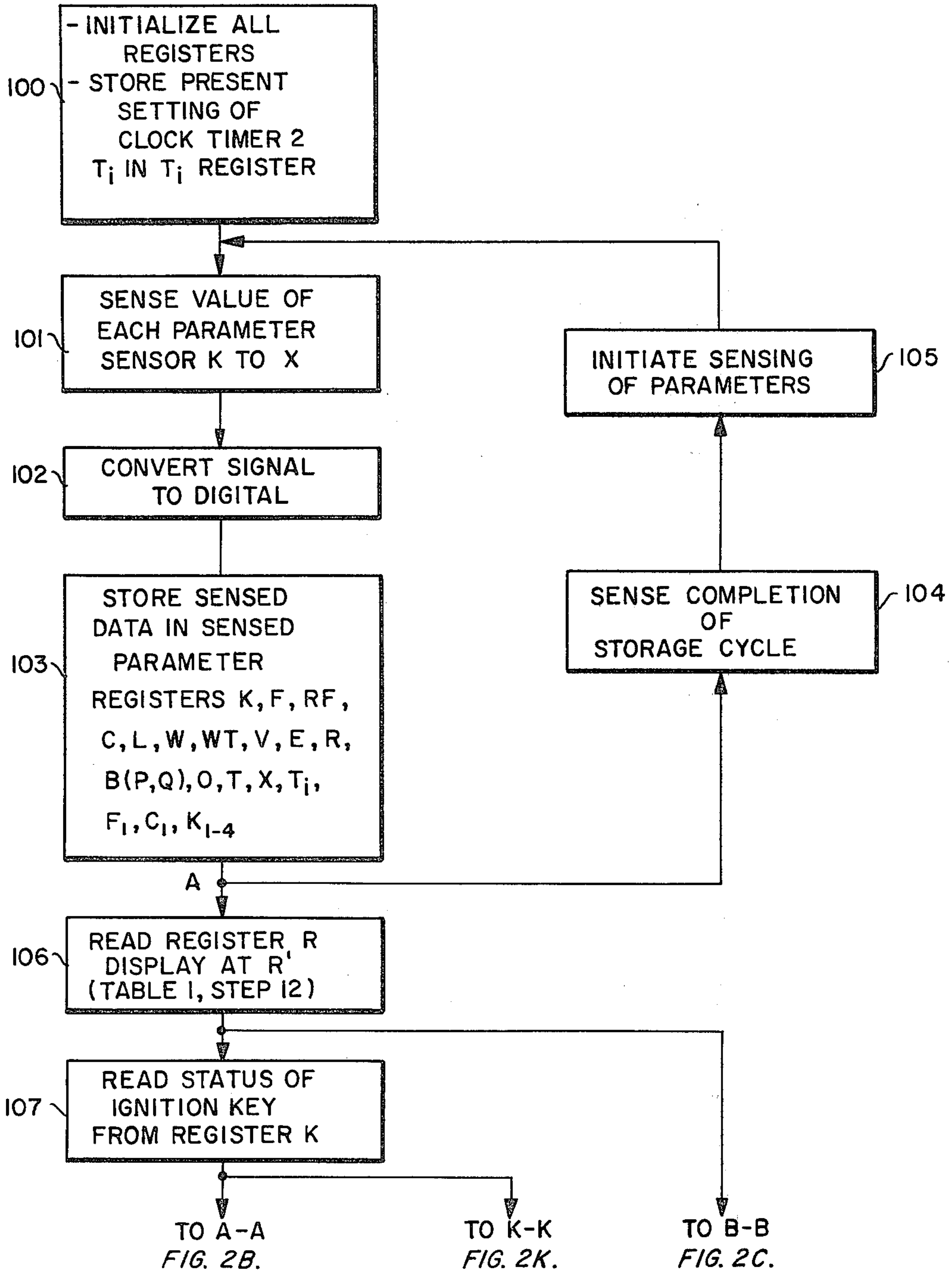
Figure 2D:
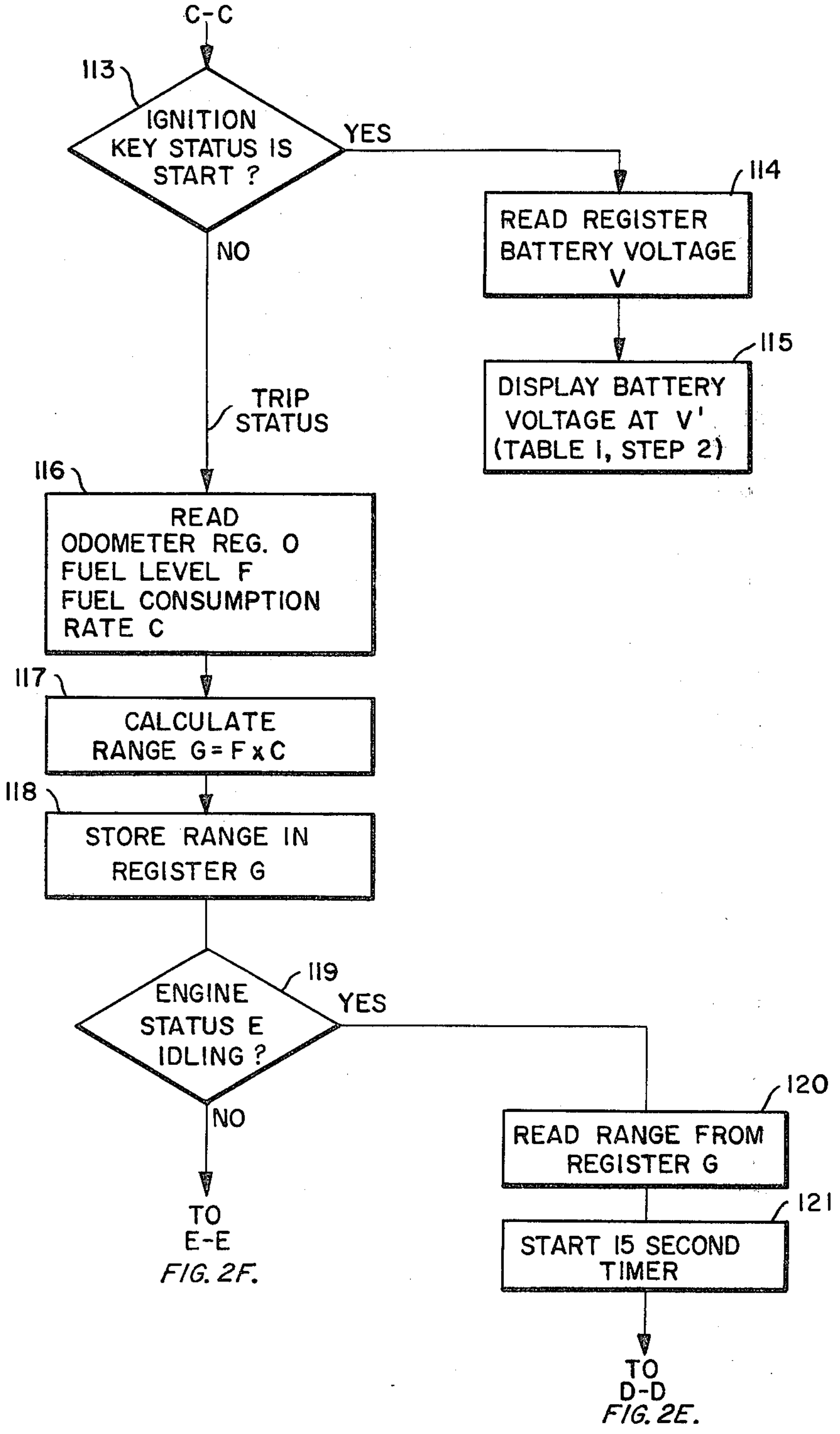
Figure 2E:
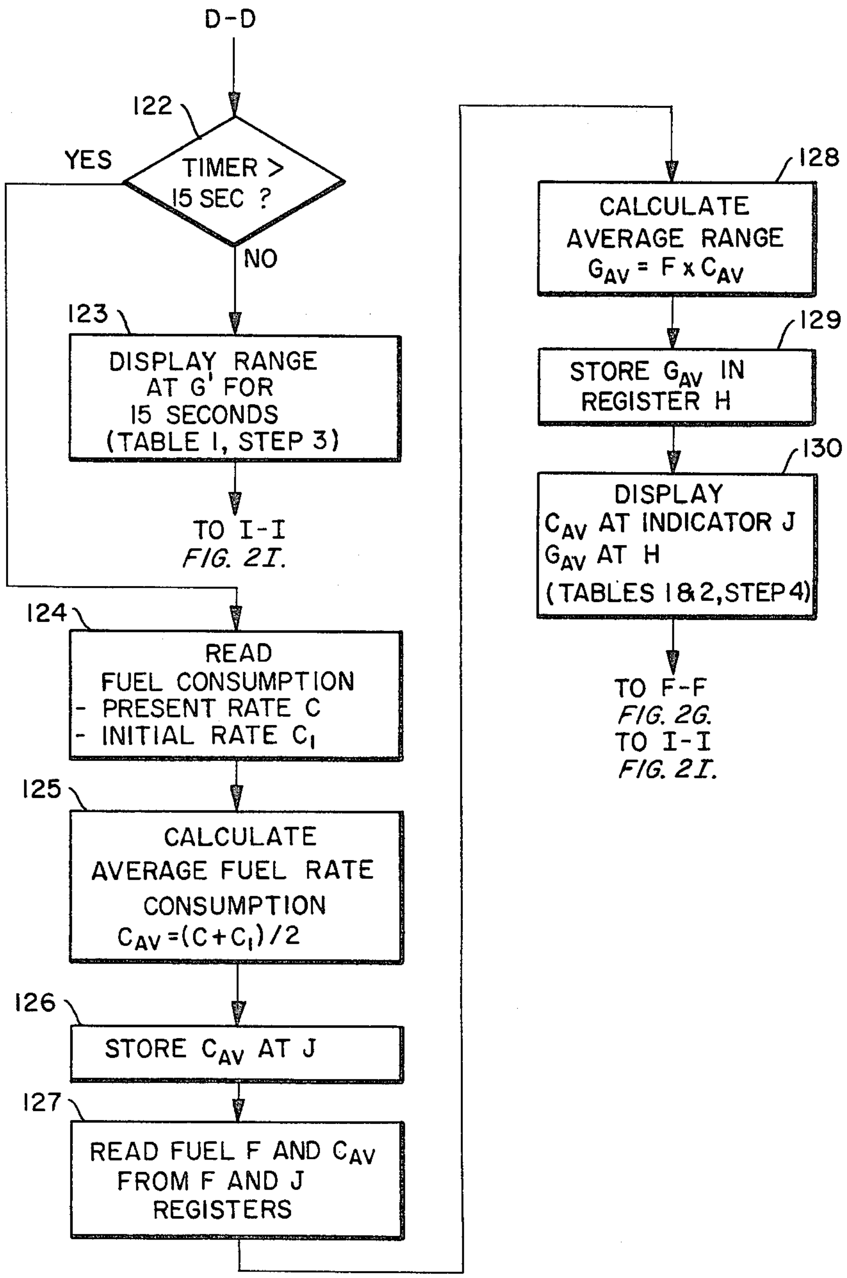

In block 122, FIG. 2E, the timer is tested and during the time when its value is less than 15 seconds, range is displayed at G′ as indicated in block 123. This indication satisfies the requirement for Table I, step 3.

Once the timer times out and the period exceeds 15 seconds, the display of range ceases and the indications for Table I, step 4, must be effected. This is the flow path following a "yes" determination at block 122, FIG. 2E.

Average fuel rate consumption must be displayed and for this purpose, at block 124, the present fuel rate consumption is read from register C and the value stored initially, during the first sensing cycle of block 103 is read from register $C_1$.

A calculation is performed in block 125 for average fuel rate consumption where $C_{AV}=(C+C_1)/2$. While a specific formula for $C_{AV}$ has been indicated, it will be appreciated by those skilled in the art that other formulas may be used to derive $C_{AV}$. Thus, if a series of values for fuel rate consumption are stored in memory, the values having been sensed at different points in time, all of these values may be employed in making a determination for $C_{AV}$.

The value for $C_{AV}$ is stored in calculated parameter register J as indicated in block 126.

In block 127, fuel F, average fuel consumption rate $C_{AV}$ are read respectively from registers F and J, and a value for average range is calculated in block 128 where average range $G_{AV}=F\times C_{AV}$. The value for $G_{AV}$ is stored in calculated parameter register H as shown in block 129.

Display of average fuel consumption rate $C_{AV}$ and average range $G_{AV}$ is effected in indicators J and H as indicated by block 130. This display thus satisfies the requirements of Tables I and II, step 4.

For the driving operation set forth in Table I, step 5, it is necessary to return to block 119, FIG. 2D where a "NO" indicates a driving operation. In block 131 of FIG. 2F, as a result of such an indication, it is necessary to determine consumption "at the moment", e.g. instantaneous consumption and a comparable range at that rate. The instantaneous fuel consumption rate is read from register C and a fuel level value from register F.

In block 132, these data are employed to calculate instantaneous range I which is equal to $F\times C$. The instantaneous range I is stored in the I register, block 133.

In block 134, the value for instantaneous fuel consumption rate C and the instantaneous range, I are read from their respective registers and displayed at indicators C′ and I, thus satisfying the indication requirements for Table I, step 5, as shown in block 134.

Turning to Table I, step 5, it will be remembered that after a trip, distance in register O and travel time in register A are no longer zero so that the result at testing block 110 of FIG. 2B will register as "NO" in such circumstances.

In order to produce the desired indications for this step, at block 135, FIG. 2B, the present time, $T_p$, is read from the clock-timer 2 and the initial time, Ti originally stored during the step of block 100, is read out. Calculation of travel time A is performed in block 136 where $A=T_P-Ti$. The result is stored in the A register.

At this point, as shown in block 137, the distance may be displayed in indicator O′ and the travel time displayed at A. This satisfies the requirements of Tables I and II, step 6.

As for special conditions, Table I, step 7, the fuel reserve as it was registered before beginning to drive can be used to augment the indications provided in steps 4 and 5 of Table I. Such a special condition can be satisfied by the two step operation shown in FIG. 2G wherein reserve fuel data is read from register RF in block 300 and displayed at indicator RF′ as shown in block 301. Inasmuch as this operation can be called upon in either steps 4 or 5 of Table I, they may be considered to follow step 130, FIG. 2E which constituted step 4 of Table I and/or to follow step 134, the final step in Table I, step 5. The artisan will appreciate that such steps may be integrated into the program at the outset or, conceivably, the program may accomodate keyboard control of this feature whereby manual input from keyboard 5 will call these steps into operation in steps 4 and/or 5 of Table I as desired.

Special conditions of Table I, such as 8 and 11 relating to "Tempomat" and condition 9 directed to braking with antibloc system constitute features of a character which will be accomodated by appropriate sensing of other parameters as indicated by sensor X in FIG. 1A, such parameters being stored in one or more registers X in the sensed parameter registers. If calculated parameters are to be derived therefrom, such would be stored in calculated parameter registers such as X''. The central processing unit 1 would indicate such parameters in indicators such as X' and X''. The necessary programming steps, with the appropriate use of timers if dictated by the character of the parameter, and processing by the central processing unit 1, is performed in the same manner as the programming and processing described in particular for the sensed and calculated parameters described above.

The same will obtain for parameters X and X'' other than those identified in steps 8, 9, and 11 of Table I.

Special condition 10 of Table I, relating to the windshield washing facility can be called into action at any particular time. As here disclosed, it is indicated as being available immediately following the storage of data relating thereto, any time after the storing operation of block 103, FIG. 2A. In the flow chart, it is indicated to follow block 106 wherein an output is extracted and input to the steps shown in FIG. 2C. At block 137 a test is made as to whether the windshield wiper is in use. Such a sensor would be one of the other parameters X, for example, a relay actuated by the power circuit for the windshield wiper motor will cause a voltage to be presented which after digital conversion may be stored in a register indicating windshield wiper use, a register such as X. A negative sensing causes the program to return to the anterior step to await further sensing. A "YES" response justifies reading register W and register WT, block 138 and the starting of a 5 or 10 second timer deriving synchronization signals from clock timer 2, block 139.

At testing block 140, the timer is tested for completion of the 5 or 10 second period. During the period, when the test indicates a "NO" condition, a display of windshield wash water W is indicated at W', satisfying Tables I and II, step 10, block 141, while a display of windshield wiper water temperature, WT is effected in indicator WT', block 142, satisfying Table I, step 10.

At the completion of the timer period in step 140, a "YES" indication will be obtained and, as shown in block 143, the display of W and WT ceases.

Table I, step 12, admits the indication of radio frequency, a condition which may be called into effect, either automatically by the program or by the operator, at will. As disclosed, this step is performed immediately following the storage of frequency information in register R as effected in block 103, FIG. 2A. Register R is read in block 106 and the results displayed at indicator R' thus satisfying the requirement of Table I, step 12.

Figure 2F:
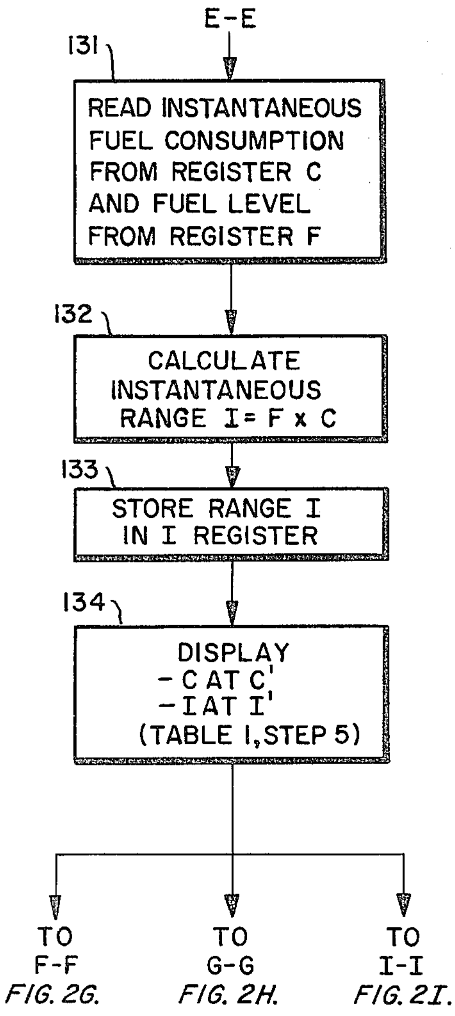
Figure 2G:
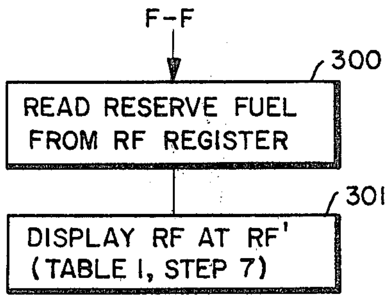
Figure 2H:
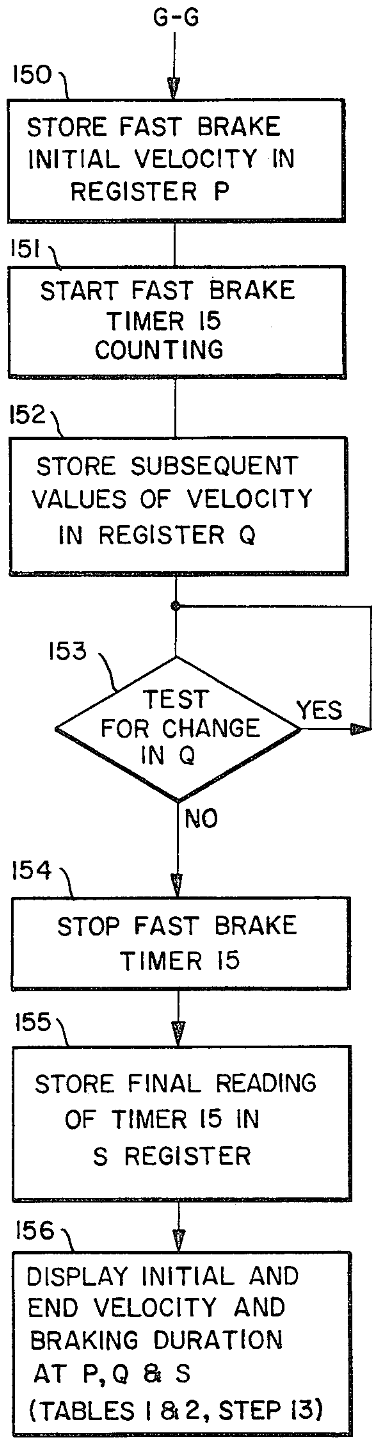
Figure 2I:
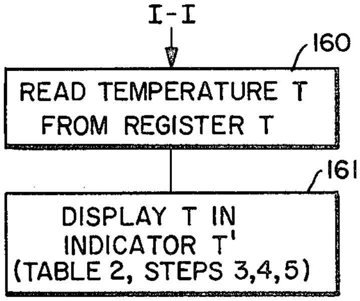

Indication of fast braking will, of course, take place during vehicle movement as, for example, during the driving operation, Table I, step 5. The program for effecting indication of the related parameters is shown in FIG. 2H which derives its input as a final stage of the program of FIG. 2F, block 134, in which displays are effected in accordance with Table I, step 5. The program in proceeding down through the operations of Table I, step 5, following block 134, proceeds to step 150 of FIG. 2H.

It will be remembered that under normal driving conditions, fast braking occurs only intermittently and thus no data will appear in registers P and Q until the first instance of braking, that is, the data initially stands at zero. Upon the actuation of the fast braking sensor B due to input from the brake actuation mechanism as previously described, the initial velocity determined from the speedometer at that instant is transmitted as a signal from B to sensed parameter register P.

Immediately, the program, under control of CPU 1, must start the fast brake timer 15 to counting as shown in block 151.

Fast braking sensor B will continue to input data values, however, these will be stored, successively due to the scanning cycle of blocks 101–105 of FIG. 2A, in register Q, the initial velocity in register P remaining unchanged. It will thus be seen that as braking continues each successive value of velocity entered in register Q should be less than its predecesor as long as brake action is continued. Upon release of brake action the rate of reduction in velocity will be markedly reduced, velocity at this point reducing only slightly.

Block 153 tests for such a change in the data in Q. As long as significant change is occuring, a "YES" answer, braking is continuing and the program recycles to test again in block 153. A "NO" answer indicates that braking has stopped and it is thus necessary to stop further inputs to end velocity register Q and to stop the fast brake timer 15, block 154. The final reading of timer 15 is stored in the S register block 155.

Subsequently, the initial velocity stored in register P, the end velocity stored in register Q and the duration of fast braking, the reading on timer 15 as stored in register S are all displayed at indicators P, Q and S as shown in block 156. As desired, registers P, Q and J may be reset to prepare for subsequent input.

From the foregoing, it will be appreciated that particular parameters may be set by the programmer, thus the criterion for change in the reading of register Q between successive values which will be taken as a "NO" change value may be set as desired.

The foregoing description indicates how the program satisfies Tables I and II, step 13.

Considering the substance of Table II, the indications required for the various steps largely parallel those shown for Table I.

It will, however, be observed that for steps 3, 4, and 5, an additional indication of temperature is required. Thus, to the indications of block 123, FIG. 2E (step 3), block 130, FIG. 2E (step 4) and block 134, FIG. 2F (step 5) will be followed by a subsequent step shown in FIG. 2I wherein the temperature is read from register T, block 160, and displayed in indicator T', block 161.

Figure 2J:
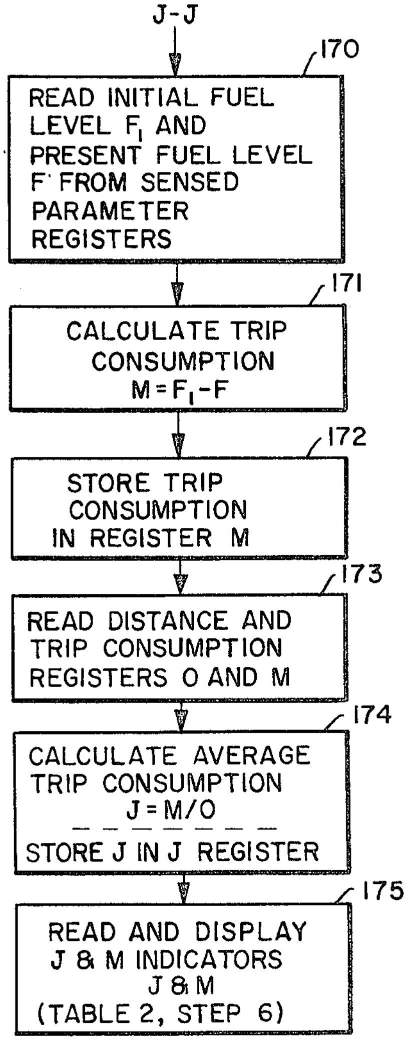

Data for trip balance, as described in Table II, step 6, in addition to distance and travel time as displayed in the comparable step in Table I, requires display of average consumption and total consumption. Thus, to the block 137 of FIG. 2B, a series of steps are appended as indicated in FIG. 2J. In block 170, initial fuel level $F_1$ and present fuel level F are read from sensed parameter registers $F_1$ and F. These values are employed in block 171 to calculate trip consumption M where $M=F_1-F$. In block 172, trip consumption is stored in register M.

In order to obtain a value for average trip consumption, distance and trip consumption are read from registers O and M, respectively, as shown in block 173. Average trip consumption J is calculated in block 174 where $J=M/O$ and the result is stored in the J register.

As indicated in block 175, the value for average trip consumption and total trip consumption, J and M respectively, may be indicated at indicators J and M. This satisfies the indication requirements of Table II, step 6.

Step 7 of Table II modifies the indications of steps 3, 4 and 5 by dropping the range indication. Thus, if it is desired to satisfy this special state, the comparable steps of Table I, namely, 123 and 130, FIG. 2E, and 134, FIG. 2F, are modified to omit range indication. For example, step 123 will be completely omitted.

In other essential respects, the indication requirements shown in Table II for steps 1-13 are the same as those indicated for the comparable steps in FIG. 1.

Figure 1B:
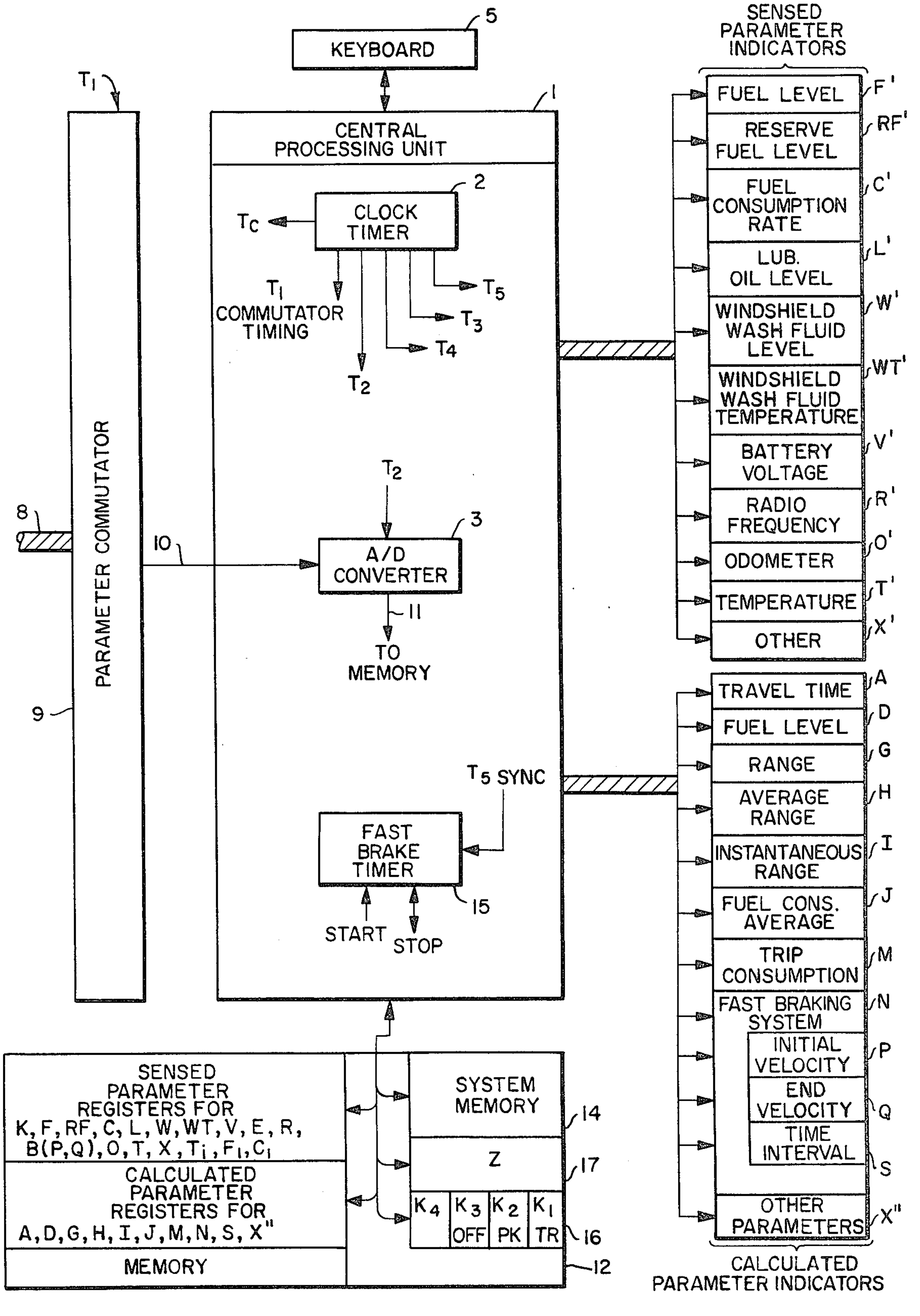

As will be apparent from the foregoing description, the normal course of action in taking a trip in the vehicle requires insertion of the ignition key in its lock in the OFF position and progressive advancing of the key through the PARK, START and TRIP positions. The termination of the trip results in return of the key to its PARK position. As previously explained, it may be desirable to store specific operational or computed values obtained during the trip for future reference. By operating the ignition key through a sequence of positions, TRIP, PARK, TRIP, PARK, OFF, such storage may be effected. Inasmuch as such storage may continue beyond the start of another trip, the data may not properly remain in the sensed and calculated parameter registers previously described. Accordingly, an area in system memory designated Z, element 17 in FIG. 1B, is reserved as a group of registers to which such selected data may be transferred for such storage. For example, it may be desirable to retain the data of the odometer residing in sensed parameter register O along with the travel time data residing in calculated parameter register A.

In order to monitor the sequence of ignition key positions, three additional registers are reserved in system memory designated as 16 in FIG. 1B, namely, registers $K_1$, $K_2$ and $K_3$. These registers will, in addition to monitoring the ignition switch sequence for causing the storing of data in registers Z, serve also to identify a switched sequence TRIP, PARK, to OFF, which sequence will cause clearing of the Z registers.

Figure 2K:
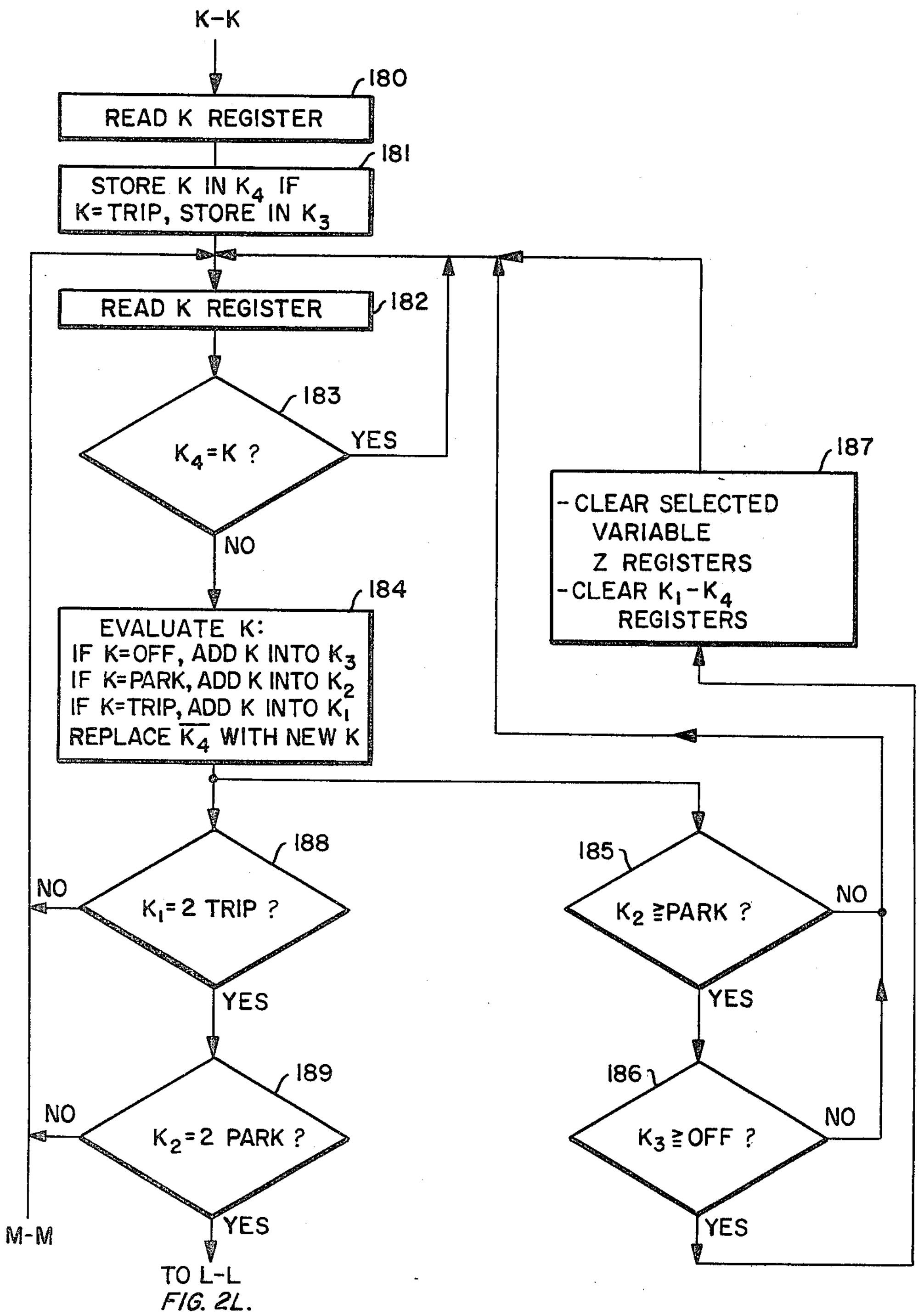
Figure 2L:
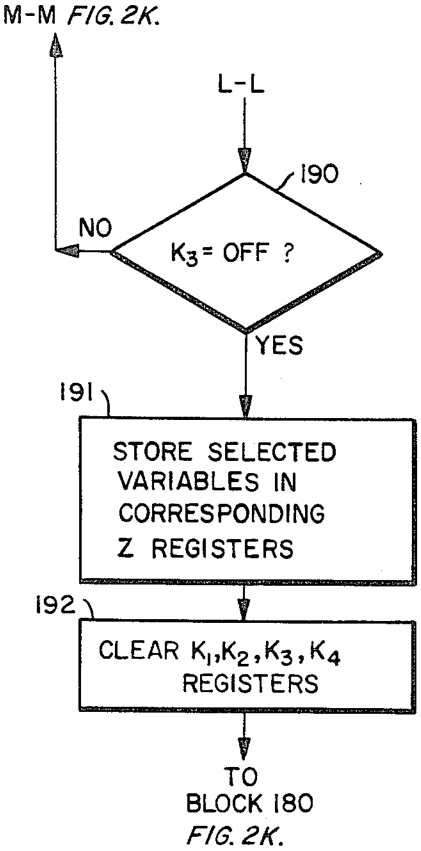

With the ignition key in the PARK position, the program, as previously described in connection with FIG. 2B, identifies a YES condition at block 108. If the operator at this point actuates the ignition switch in either of the two sequences for storage of selective values in registers Z or clearing the Z registers, the sequence of steps shown in FIG. 2K is performed. While the sequences may be performed in any order, the following description will assume that the operator first attempts to clear the Z registers, that is, the ignition key will be actuated in the sequence TRIP-PARK-OFF.

The $K_1$-$K_3$ registers differ from the sensed and calculated parameter registers in that they will be used to store multiple entries of sensing from the K register. It will be remembered that the parameter sensor for the ignition lock/key position may register one of four different voltage values which, may arbitrarily be 3, 6, 9 and 12 volts for the OFF, PARK, START and TRIP positions. When such sensings are translated into digital code for registration in sensed parameter register K, a single such sensing appears, being replaced subsequently during the signatory sensing loop of blocks 101-105 of FIG. 2A as the operator switches the ignition key to subsequent positions. In contrast, the $K_1$-$K_3$ registers will record multiple positionings of the ignition key to the same position. Thus, register $K_3$ will record the number of times the key is positioned at OFF, $K_2$ will record the number of PARK positions, while $K_1$ will record the number of TRIP positionings. As those skilled in the art are aware, this can be effected by the central processing unit 1 withdrawing the value standing in the $K_3$ register representing a first key positioning, withdrawing a value from the sensed parameter register K representing a second positioning to the same position, adding the two values in the arithmetic portion of the central processing unit 1 and returning the sum to register $K_3$. The same summing process can be performed with the values standing in registers $K_1$ and $K_2$. A fourth register $K_4$ is employed to remember the last key position.

If now the vehicle operator actuates the ignition key through the TRIP-PARK-OFF sequence, the following steps take place. The TRIP position is sensed by the parameter sensor K and a digital value representative of trip is stored in sensed parameter register K. In FIG. 2K the K register is read in block 180 and in block 181 is stored in register $K_4$. It is also tested to determine whether the value read equals a value equivalent to TRIP and, if so, it is stored also in register $K_3$. A distinction is to be observed between the use of register $K_4$ and that of registers $K_1$-$K_3$. The latter are accumulator registers serving to record plural entries of the switch positions whereas register $K_4$ is employed to retain a value representing a previous switch position with which a present switch position can be compared in order to determine whether a change has occured. It will be noted, that as the sensed cycle of blocks 101-105, FIG. 2A, proceed, many repetitions of that cycle may take place successively reregistering similar entries from the sensors into the sensed parameter registers. The ignition key thus could reside in the TRIP position through many sensing cycles and only a single value would reside over that period of time in the K register, a value representing TRIP, for example. Returning to FIG. 2K, through such a period of time, the K register would be read in block 182, and the value so read would be tested in block 183 against the value standing in register $K_4$. When no change occurs, a YES result would be achieved and the K register would be recycled to read again in block 182.

If now the vehicle operator switches the ignition key from TRIP to a PARK position, a PARK value will be stored in K register. This will be read in block 182, tested against the TRIP value stored in register $K_4$. The values for TRIP and PARK being different, a NO result will be achieved.

In block 184, whatever was read in block 182 from the K register is evaluated to determine whether it is of OFF, PARK or TRIP value and is added to the value in the corresponding register. OFF values being added to what stands in register $K_3$, PARK values being added to those of register $K_2$ and TRIP values being added to the value standing in register $K_1$. The ignition key having been passed through the TRIP and PARK positions, at least a single entry is now standing in registers $K_1$ and $K_2$. Thus, two of the criteria for clearing registers, TRIP and PARK have been achieved.

At the same time, the previous value read from the K register which was stored in register $K_4$ is replaced in $K_4$ with the newly read and different value from the K register.

In block 185, the value of the $K_2$ register is tested to determine whether at least one entry for PARK is standing in the register, if not, the program recycles to read another value standing in the K register at block 182.

Since a PARK position was taken, the answer in the present example will be YES and a test is subsequently performed in block 186 to determine the existence in register $K_3$ of an OFF entry. In the example, the operator has not yet switched the ignition key to OFF so that the result of the test is NO and the program recycles to read another value from the K register at block 182.

If now the operator switches the ignition key to OFF, such a condition will be sensed, stored in the K register, read in block 182, tested against the previous PARK value which has been stored in register $K_4$, block 183, evaluated in block 184 as an OFF value and stored in register $K_3$, and will be used to replace the PARK value in register $K_4$.

Now, both blocks 185 and 186 test as a YES so that the conditions of TRIP, PARK and OFF which satisfy the requirement for clearing the z registers are completed. Block 187 thus serves to clear the Z registers to 0. It will be remembered that the Z registers are those registers to which values of selected parameters, such as distance O and travel time A, are to be transferred.

If the vehicle operator actuates the ignition switch through the sequence TRIP, PARK, TRIP, PARK, OFF, the sequence described in connection with blocks 180–184 will take place as previously described. However, before the final OFF position, an extra TRIP and PARK position are encountered. Block 184 will serve to accumulate these additional position values in registers $K_1$ and $K_2$.

Blocks 188 and 189 test for these additional entries in registers $K_1$ and $K_2$ failing which, NO answers may be achieved and recycling at block 182 take place.

Only after a YES is determined in both blocks 188 and 189 will an OFF position be significant for completing the sequence. Only if an OFF position is then sensed by the sensor K, recorded in the register K, read at block 182, evaluated and assigned to register $K_3$ in block 184, will the proper sequence for transferring data such as travel time A and distance O to the Z registers be satisfied. This condition is sensed in block 190 of FIG. 2L. A YES result having been determined, the CPU 1, in block 191, stores selected variables extracted from the sensed and calculated parameter registers, for example, O and A, in Z registers.

In block 192, the CPU 1, clears registers $K_1$, $K_2$, $K_3$ and $K_4$ in preparation for subsequent input and returns to block 180, FIG. 2K.

The invention also contemplates identifying the condition when a particular parameter exceeds an established reference limit set either as a maximum or minimum for safety or for other reasons. For example, it may be expedient to indicate when fuel F falls below an established minimum. Other parameters may on occasion exceed a maximum reference value. For the purposes of explanation, it will be assumed that a minimum level for fuel level F is established.

The CPU 1 may store the reference minimum value in the system memory in similar fashion to the storage effected for stored parameters in Z for example. This may be done during initial programming or by the use of read only memory (ROM) or by employing entry using keyboard 5.

During travel, the value for F as stored in the sensed parameter register F will slowly decrease toward the stored reference minimum value. At block 400, FIG. 2M, the CPU 1 will read the threshold or minimum reference value from system memory and also the present F value from the F register. At blocks 401 and 402 the two values are compared in the arithmetic section of the CPU 1. The result of the comparison is tested to see which is greater. If the reference value (minimum allowable fuel) is greater, an alarm is actuated at 403, optically or acoustically, and F register values continue to be tested. If a NO result is derived from the test, F values continue to be sampled for testing but no alarm will be sounded, of course.

Figure 2M:
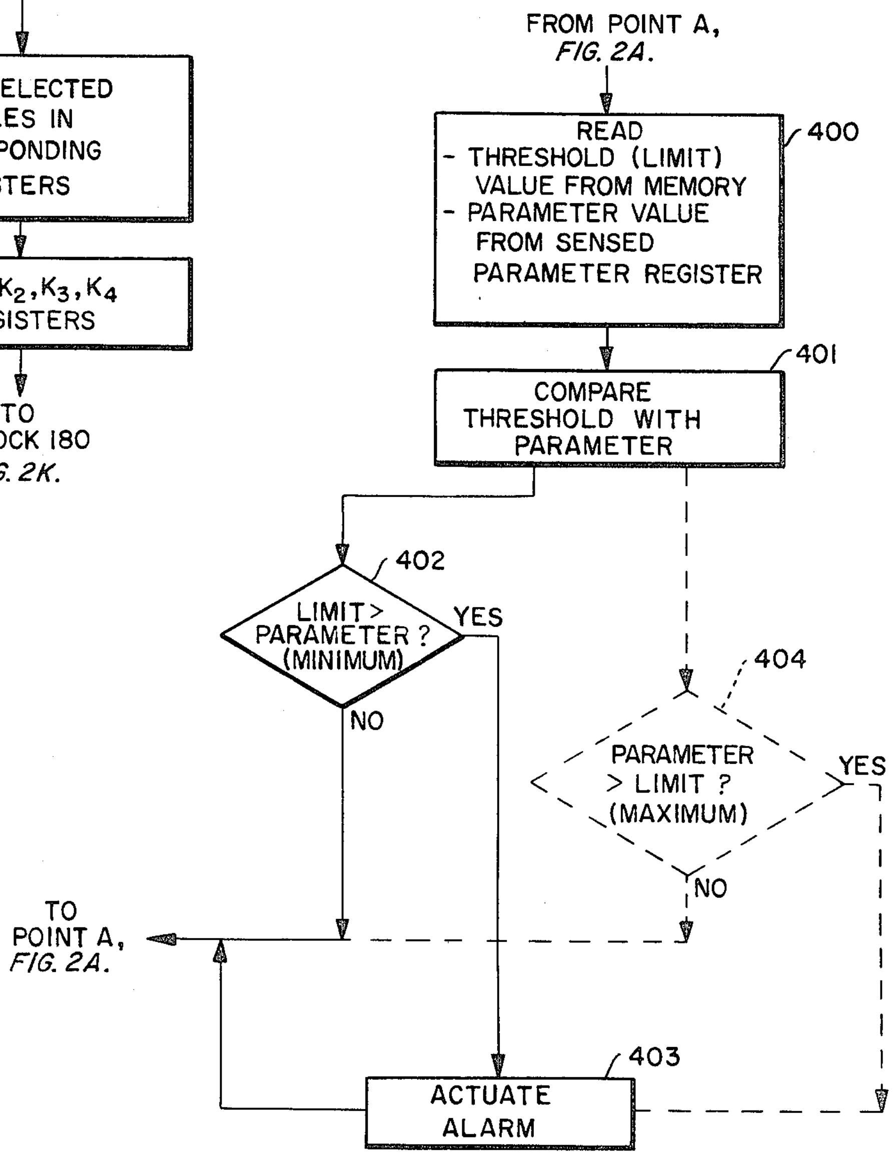

Shown in dotted lines is a comparable step which is used if a parameter with a maximum value is to be processed. The steps of FIG. 2M are shown in exemplary fashion as assuming a position in the overall system between steps 103 and 106, point A of FIG. 2A. However, those familiar with such procedures will appreciate that the steps may be employed in other positions in the system, for example, wherever the particular parameter involved is to be used for indication.

The invention has thus been disclosed as an on-board computer system for a vehicle wherein various vehicular operational parameters are sensed, other parameters calculated therefrom and selected subsets of such parameters, both sensed and calculated, are presented for indication by way of processing in the central processing unit of the computer under the control of the ignition switch as it proceeds through a plurality of operational positions.

The particular description employed is exemplary only and it will be apparent to those skilled in the art that other procedures employing different sequences of steps, other parameters and other indications, may be employed without departing from the spirit of the invention disclosed. Therefore, I do not wish to be limited to the details described herein but intend to cover all such modifications as are encompassed by the scope of the appended claims.

I claim:

1. A device for processing operational data for vehicles having a multiposition ignition lock means, comprising sensing means to pick up the operational data, data processing means for receiving said sensed operational data, means receiving processed data for display of said data, a switch means for switching an indicator on or off when threshold values are exceeded or the value goes below the threshold in accordance with at least one of ignition lock means positions OFF, PARK, TRIP, and START and the operational states of the vehicle, and means for storage and clearing of values of a specific sequence of ignition lock means actuations.

2. A device for processing operational data as in claim 1, characterized in that said indicator for display is an optical indicator means comprising at least a single-row multiple-cell letter-and-numeral indicator.

3. A device for processing operational data as in claim 1, characterized in that said means for storage and clearing comprises means for storing specific operational and/or computed values when after completion of a trip the ignition lock means is actuated in the sequence TRIP, PARK, TRIP, PARK, OFF.

4. A device for processing operational data as in claim 1, characterized in that said means for storing and clearing comprises means for clearing some or all of the operational and/or computed values when after completion of a trip the ignition lock means is actuated in the sequence TRIP, PARK, OFF.

5. In an on-board data processing system for a vehicle, said system having a switch capable of location in a plurality of positions, the method of advancing said switch through a first series of at least two of said switch positions, sensing values of a first set of sensed parameters under control of the positioning of said switch, processing at least a first subset of said first set of sensed parameters to derive values of a second set of parameters different from said first set of sensed parameters, and indicating values of at least a second subset of said first and second sets of parameters.

6. The subject matter of claim 5 wherein said sensed parameters comprise parameters of vehicular operation.

7. The subject matter of claim 5 further comprising the step of storing the values of at least a third subset of said first and second sets of parameters in storage positions of said data processing system after completion of a vehicle trip.

8. The subject matter of claim 7 further comprising the step of advancing said ignition switch through a second series of positions to effect said storage step.

9. The subject matter of claim 8 further comprising the step of advancing said ignition switch through a third series of positions different from said second series to clear said storage positions.

10. The subject matter of claim 5 further comprising the steps of comparing the value of each of a third subset of said first and second sets of parameters with an established limit value to determine whether said limit value has been reached and indicating the results of said comparison.

11. The subject matter of claim 10 wherein at least one of said indicating steps is acoustical.

12. The subject matter of claim 10 wherein at least one of said indicating steps is optical.

13. In an on-board data processing system for a vehicle, a multiposition switch, means for sensing values of a first set of sensed parameters under control of the positioning of said switch, means for processing at least a first subset of said first set of sensed parameters to derive values of a second set of parameters different from said first set of sensed parameters, and means for indicating values of at least a second subset of said first and second sets of parameters.

14. The subject matter of claim 5 or 13 wherein said switch is the ignition switch which is advanced through positions controlling different modes of vehicular operation.

15. The subject matter of claim 14 wherein positions of said ignition switch control the vehicle to assume OFF, PARK, START and TRIP vehicular operating conditions.

16. The subject matter of claim 6 further comprising means for storing the values of a third subset of said first and second sets of parameters in storage positions of said data processing system after completion of a vehicle trip.

17. The subject matter of claim 16 further comprising means for advancing said ignition switch through a first series of positions to effect said storage.

18. The subject matter of claim 17 further comprising means for advancing said ignition switch through a second series of positions different from said first series to clear said storage positions.

19. The subject matter of claim 6 further comprising means for comparing each of the values of a third subset of said first and second sets of parameters with a corresponding limit value to determine whether said limit value has been reached and means for indicating the results of the comparison.

20. The subject matter of claim 19 wherein at least one of said indicating means is acoustical.

21. The subject matter of claim 19 wherein at least one of said indicating means is optical.

22. A device for processing operational data set forth in claim 13, wherein said sensed parameters comprise parameters of vehicular operation.

* * * * *